United States Patent
Heddes et al.

(10) Patent No.: US 6,463,500 B1
(45) Date of Patent: Oct. 8, 2002

(54) APPARATUS AND METHOD TO ACCESS COMPUTER MEMORY BY PROCESSING OBJECT DATA AS SUB-OBJECT AND SHAPE PARAMETER

(75) Inventors: Marco C. Heddes, Raleigh; Piyush Chunilal Patel, Cary; Mark Anthony Rinaldi, Durham, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,775

(22) Filed: Jan. 4, 2000

(51) Int. Cl.⁷ ............................................... G06F 12/00
(52) U.S. Cl. ......................................................... 711/5
(58) Field of Search ............................. 711/5, 202, 211, 711/212, 217, 218

(56) References Cited

U.S. PATENT DOCUMENTS

| | | | |
|---|---|---|---|
| 4,945,475 A | 7/1990 | Bruffey et al. | 364/200 |
| 5,289,567 A | 2/1994 | Roth | 395/133 |
| 5,692,180 A | 11/1997 | Lee | 395/610 |
| 5,701,467 A | 12/1997 | Freeston | 395/611 |
| 5,786,955 A | 7/1998 | Kori et al. | 360/72.1 |
| 5,924,115 A | 7/1999 | Von Herzen et al. | 711/117 |

*Primary Examiner*—Kevin Verbrugge
(74) *Attorney, Agent, or Firm*—Patrick J. Daugherty; Driggs, Lucas, Brubaker & Hogg

(57) ABSTRACT

A method is provided for utilizing a memory system which allows for the fast and efficient writing and reading of objects to and from diverse memory chips. A computer system and memory system complex according to method is also provided. The invention defines objects in terms of "shapes." The shape of an object is defined by two parameters: "Width" and "Height." Memory system memory chips may comprise sets of different kinds of memory modules which vary in terms of access speed, latency and memory width, such as for example DRAM or SRAM memory modules. The Height of an object denotes the number of consecutive address locations at which the object is stored on a memory module. The Width of an object denotes the number of memory modules at which the object is stored. An advantage of the invention is that objects are defined in terms of "sub-objects" optimized for the memory system memory modules. The sub-objects match the line-width of the memory, thereby allowing the objects to be efficiently written to different memories or memory banks. A further advantage of the invention is that the sub-object shape is transparent to the requester (i.e. transparent to application assembly language). A further advantage of the invention is that sub-objects are handled independently by the memory arbiter, i.e. they can be written to the memory or read from the memory in any order. The complex may further comprise a Tree Search Memory (TSM) system that utilizes a "tree" object hierarchy to perform high-speed memory lookups. Shaping is used to specify how an object is stored in the TSM. The trees consist of different kinds of objects with different shapes. An important advantage of the invention is that the concept of shapes can be used for memory bandwidth distribution and performance increase, allowing objects that are frequently read from memory to be distributed in specific sub-object ordering.

9 Claims, 3 Drawing Sheets

APPARATUS AND METHOD TO ACCESS COMPUTER MEMORY BY PROCESSING OBJECT DATA AS SUB-OBJECT AND SHAPE PARAMETER

FIELD OF THE INVENTION

This invention relates generally to computer systems and memory complexes that can store different types of objects in a rapid and efficient manner. In more particular aspects, this invention relates to an improved method of storing objects into memory wherein the memory complex can define large object input data as "sub-objects" which match the characteristics of the memory complex memory components.

BACKGROUND OF THE INVENTION

An "object" is discrete bundle of information written to or read from the memory complex of a computer system. Memory complexes generally comprise memory modules, such as DRAM and SRAM. A memory module has a plurality of memory addresses which may each receive data in a "write" operation or send data in a "read" operation. Different memory modules may contain different amounts of data in their addresses. In many cases, an object written into memory cannot fit in a single memory location, and accordingly it must be allocated into different memory locations. Conventional memory complex systems store objects that comprise N memory locations in a fixed way, like in N consecutive memory locations (i.e. at address A, A+1, A+2, ... A+N−1), or in N different memory modules at the same corresponding address (i.e. at address A, A+$2^{20}$, A+$2*2^{20}$ ..., wherein $2^{20}$ is an exemplary maximum memory module address range). To read or write such an object requires a sequential series of read or write operations in the former case, and specific address assignments across numerous memory modules in the latter. By requiring a sequential series of read/write cycles to process an object, performance of a programming application is significantly degraded when compared to an application that can process an object in one operation, or "bus cycle." And where a common address must be used in numerous memory modules, if any of the addresses are unavailable a write operation will fail and must be executed again until another common address is found. Therefore application programmers must know the address sizes of the memory complex memory modules in order to arrive at a programming solution for programming applications which require read/write operations involving objects. For example, an application program written for a memory complex comprising DRAM memory chips with a width of 128 bits may write objects of up to 128 bits in width in one location on one chip; however, if the same program is used with a memory complex comprising SRAM memory chips with a widths of 32 or 36 bits, any objects over 36 bits in width must be written in more than one location in more than one read/write cycle, resulting in a significant degradation of the performance of the application on that system when the application processes objects over 36 bits in size. Therefore, a program written for memory complexes comprising DRAM memory chips may perform unacceptably in computer systems using memory complexes comprising SRAM chips.

What is needed is a computer system and memory complex that can efficiently store objects in a variety of memory modules, thereby allowing programming applications to read and write objects to a variety of memory chips structures without regard to specific memory chip architecture within the memory complex. This would allow an application programmer to solve for the size of the data handled by the program independent of the physical representation of the memory structures used by the applications, and allow a variety of memory complexes to be used with a given programming solution.

SUMMARY OF THE INVENTION

A method is provided for utilizing a memory system which allows for the fast and efficient writing and reading of objects to and from diverse memory chips. A computer system and memory system complex according to method is also provided. The memory chips may comprise sets of different kinds of memory modules which vary in terms of access speed, latency and memory width, such as for example DRAM or SRAM memory modules.

The invention defines objects in terms of "shapes." The shape of an object is defined by two parameters: "Width" and "Height." The Height of an object denotes the number of consecutive address locations at which the object is stored on a memory module. The Width of an object denotes the number of memory modules at which the object is stored. An advantage of the invention is that objects are defined in terms of "sub-objects" optimized for the memory system. The sub-objects match the line-width of the memory, thereby allowing the objects to be efficiently written to different memories or memory banks. A further advantage of the invention is that the sub-object shape is transparent to the requester (i.e. transparent to application assembly language). A further advantage of the invention is that sub-objects are handled independently by the memory arbiter, i.e. they can be written to the memory or read from the memory in any order.

The complex may further comprise a Tree Search Memory (TSM) system that utilizes a "tree" object hierarchy to perform high-speed memory lookups. Shaping is used to specify how an object is stored in the TSM. The trees consist of different kinds of objects with different shapes. An important advantage of the invention is that the concept of shapes can be used for memory bandwidth distribution and performance increase, allowing objects that are frequently read from memory to be distributed in specific sub-object ordering.

DESCRIPTION OF THE PREFERRED EMBODIMENT

Figure 1:
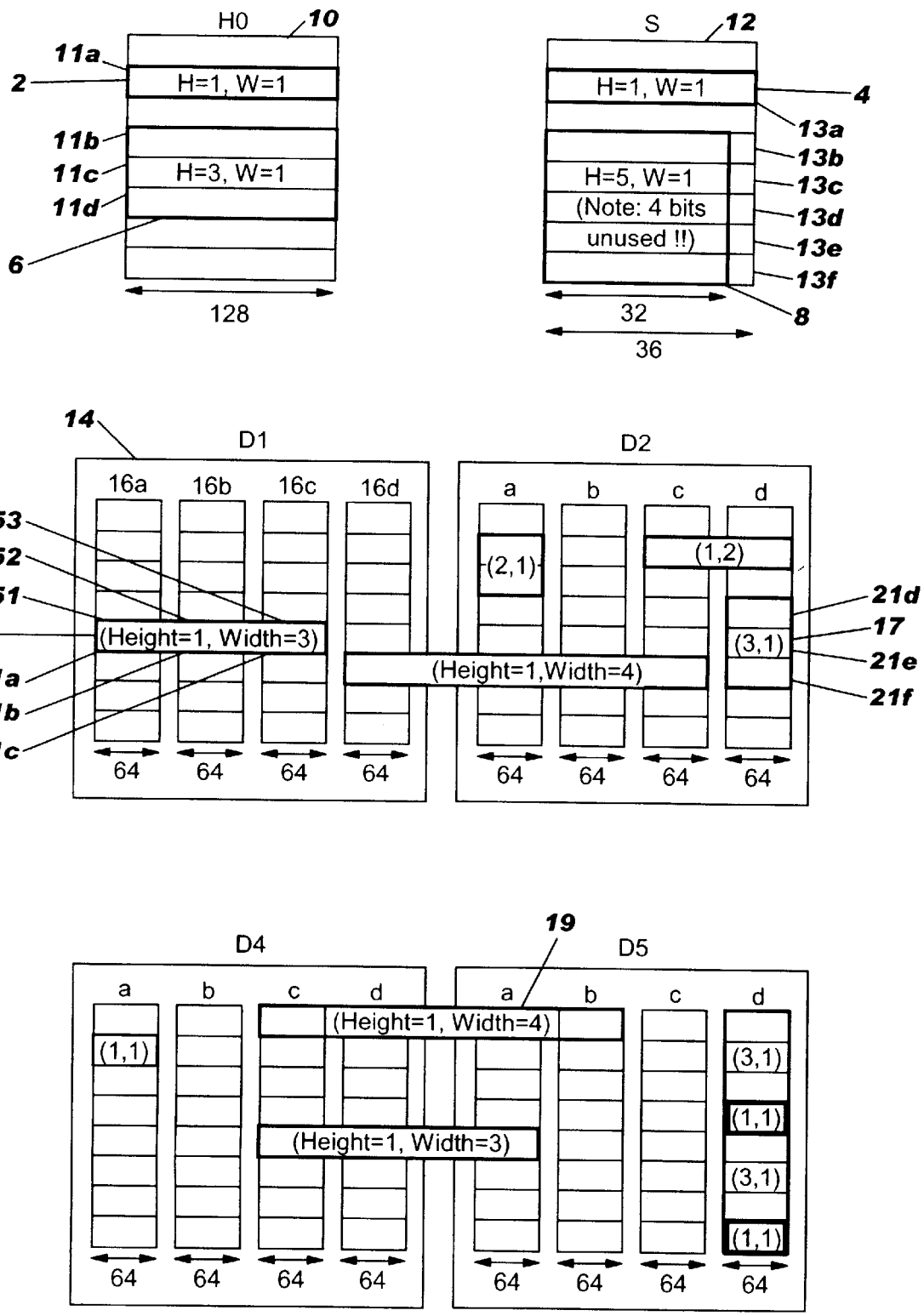
FIG. 1 is a diagrammatic representation of exemplary memory modules of the present invention.

Referring now to the drawings, and for the present to FIG. 1, exemplary DRAM and SRAM memory modules utilized in the memory complex are depicted. Other memory modules may be utilized in the invention, and this disclosure is not believed to be limiting as to the type and number of memory components used in the present invention.

An important feature of the invention is the definition of objects in terms of their "shape." The shape of an object is defined by two parameters: Width and Height. The Height of an object denotes the number of consecutive address locations on a single memory module at which the object is stored. The Width of an object denotes the number of consecutive banks at which the object is stored. An object shape notation will be (height, width).

Objects that are small enough to fit within a single memory location or banklocation don't need a shape, and it is defined that these objects have a Height=1 and Width=1. Thus for example an object 2 which has a size of 48 bits may be stored in one memory address location 11a of DRAM memory module 10, and accordingly has a shape of (1, 1). Similarly, an object 4 which is 32 bits in size is stored in one memory address location 13a of SRAM memory module 12, and also has a shape of(1, 1). The Width must always be 1 for objects stored in SRAM, and may be greater than I for objects in DRAM.

As soon as an object does not fit in a single memory/bank location, it must have a Width>1 or a Height>1, or both. For example, an object 6 stored on DRAM memory module 10 occupies three consecutive memory addresses 11b, 11c, and 11d, and has a shape of (3,1). In order to read or write this object, the memory complex must perform three sequential read/write cycles. Therefore, a request from the computer system with regard to object 6 will take three times as long when compared to object 2. Similarly, object 8 has a shape of (5,1) and must be read from or written to SRAM memory module 12 by five sequential cycles.

An advantage of the invention is that objects are defined in terms of "sub-objects" that match the line-width of the memory modules, thereby allowing the objects to be efficiently distributed among different memories or memory banks. A further advantage of the invention is that the object-shape is transparent to the requester: the memory complex defines the sub-object shaping, not the application code. Referring again to FIG. 1, object 18 is defined by the present invention with a shape of (1,3) and written as sub-objects 21a, 21b and 21c. Sub-object 21a is written to address 51 on DRAM module 16a, sub-object 21b is written to address 52 on DRAM module 16b, and sub-object 21c is written to address 53 on module 16c. Memory modules 16a through 16d are attached to memory circuit board 14. The sub-objects 21a, 21b and 21c are written or read by one request from the computer system to the memory complex, and appear to the computer system to be processed simultaneously: the operation is transparent in that the sub-objects behave as one object to the application program.

Figure 2:
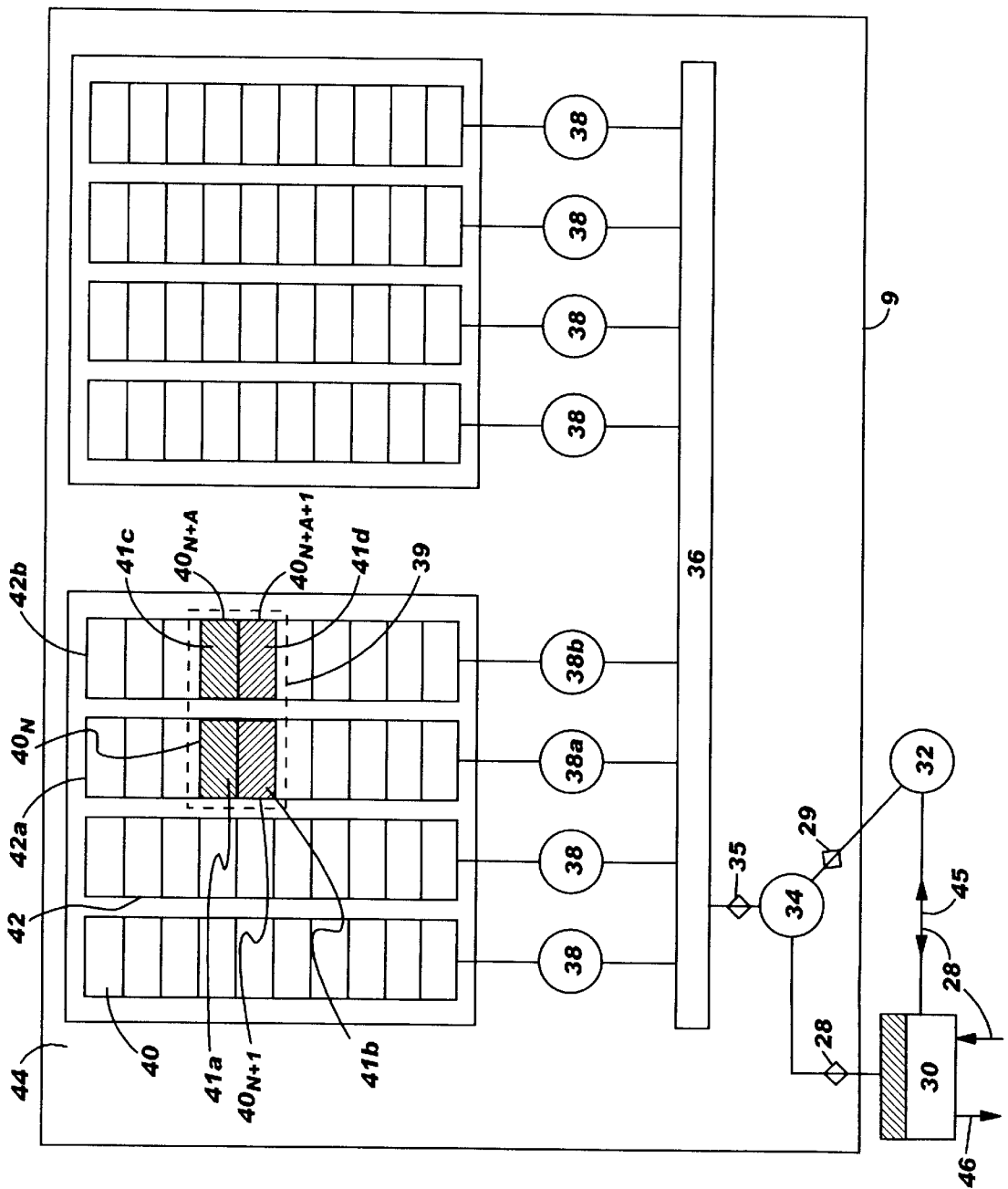
FIG. 2 is a detailed view, somewhat diagrammatic view of the structure of the computer system and memory complex of the present invention.

Referring now to FIG. 2, an overview of the structure and operation of the computer system and memory complex according to the present invention is shown as it is formed on an IBM network processor family. The computer system local bus 30 receives object data 28 from an outside source (not shown) and passes the object data 28 to a computer system assembly code engine 32 and to a request controller 34 within a memory complex 9. The assembly code engine 32 compiles high level computer programming language, such as "C", a computer programming language well known in the art. The computer system may comprise a plurality of assembly code engines 32, each connected to the local bus 30 and the request controller 34. The object data 28 contains a shape parameter and a base address. The shape parameter and base address may come from the object data 28 compile code processed by the assembly code engine 32, or they may come from a computer system register (not shown) located within the computer system. The assembly code engine 32 processes object data 28 into sub-object data 29. The sub-object data 29 is then communicated from the assembly code engine 32 to the request controller 34. The request controller 34 processes the sub-object 29 and outputs data through a mux data switch 36 to one or more arbitrators 38. Each arbitrator 38 has a memory module 42 associated with it. The memory modules 42 are attached to at least one memory chip board 44. The arbitrators 38 perform a read or write to at least one address 40 on their associated memory module 42, and communicate back to the assembly code engine 32 through the mux switch 36 and the request controller 34 that they have completed the read or write operation. The assembly code engine 32 then outputs data 46 through the local bus 30 to the requesting device (not shown).

While the arbitrators 38 are important to the embodiment of the present invention as illustrated in FIG. 2, other embodiments may not comprise arbitrators 38: alternative embodiments of the present invention may connect the mux data switch 36 directly to the memory modules 42 without the intervening arbitrators 38. This is the case where only one system device will access the memory complex, and therefore is no need to arbitrate access to the individual memory modules among simultaneous device requests.

In general, the computer system and memory complex shown in FIG. 2 operates in the following manner: The assembly code engine 32 processes the object data input 28 into sub-object data 29. The sub-object data 29 comprises read or write instructions, the object data 28, and the object shape parameters. The sub-object data 29 is then outputted to the request controller 34. The following provides the exemplary details of an object write operation; the details of an exemplary object read operation will be discussed afterward.

Memory write operation. When the computer system wants to write object data 28 to memory, object data 28 is sent through local bus 30 to the assembly code engine 32. The assembly code engine 32 processes the object data input 28 into sub-object data 29. The sub-object data 29 comprises a write instruction, the object data 28, and the object shape parameters. The sub-object data 29 is then outputted to the request controller 34. The request controller 34 analyzes the shape parameters and distributes the object data 28 and a write instruction through the mux switch 36 to the arbitrators 38 according to the object shape parameters. For example, referring again to FIG. 2, object data 28 is shown as comprising object 39. Object 39 has a shape of (2,2), and the request controller 34 distributes object 39 accordingly in four sub-object data groups 41 through the mux switch 36 to two arbitrators 38 with instructions to write to their associated memory modules 42: sub-object data groups 41a and 41b are sent to arbitrator 38a, and sub-object data groups 41c and 41d are sent to arbitrator 38b.

Arbitrator 38a receives the sub-object data groups 41a and 41b along with a write instruction. Arbitrator 38a finds two open memory addresses $40_N$ and $40_{N+1}$ on its associated memory module 42a and writes sub-objects 41a and 41b to these addresses. The order of the write operations is not important: arbitrator 38a may receive 41a and 41b in any order and write them to either address $40_N$ or address $40_{N+1}$, in the alternative and in any order. When it has completed this operation arbitrator 38a communicates back through the mux switch 36 to the request controller 34 that the write operation is complete and provides the memory address $40_N$ and $40_N$_location data for sub-object data groups 41a and 41b. Arbitrator 38b performs similarly: it receives the sub-object data groups 41c and 41d and writes them to two open memory addresses $40_{N+A}$ and $40_{N+A+1}$ on its associated memory module 42b, and then communicates back through the mux switch 36 to the request controller 34 that the write operation is complete and provides the memory address $40_{N+A}$ and $40_{N-A-1}$ location data for sub-object data groups 41c and 41d.

The request controller 34 receives this data and sends the data back to assembly code engine 32. The assembly code engine 32 compiles this data as output data 45. Output data 45 contains data that indicates that object 39 has been written to memory at memory addresses $40_N, 40_{N-1}, 40_{N-A}$ and $40_{N+A+1}$. The assembly code engine 32 then communicates output data 45 back through the local bus 30 to the computer system device requesting the operation (not shown).

Memory read operation. Referring again to FIG. 2, a computer system device (not shown) sends a read request for object data 28 through local bus 30 to assembly code engine 32. Assembly code engine 32 processes object data 28 into sub-object data 29. Sub-object data 29 contains a read instruction, the memory address locations $40_N, 40_{N+1}, 40_{N+A}$ and $40_{N+A+1}$ of sub-object data groups 41a through 41d, respectively, and object 39 shape parameters. The assembly code engine 32 sends the sub-object data 29 to the request controller 34. The request controller 34 accordingly sends a read instruction through the mux switch 36 to arbitrator 38a for memory addresses $40_N$ and $40_{N+1}$, and a read instruction to arbitrator 38b for memory addresses $40_{N+A}$ and $40_{N+A+1}$. When arbitrators 38a and 38b read memory addresses $40_N$ and $40_{N-}$ and memory addresses $40_{N-A}$ and $40_{N-A-1}$, respectively, they acquire sub-object data groups 41a and 41b and sub-object data groups 41c and 41d, respectively, and send these sub-object data groups back through the mux switch 36 to the request controller 34. Arbitrators 38a and 38b at that time also communicate to the request controller 34 that they have completed their instructions, i.e. the read commands sent by the request controller 34.

The request controller 34 outputs to the assembly code engine 32 the following data: that it has completed the requested read operation for object 39, that object 39 has the shape parameters (2,2) and is constituted by the sub-object data groups 41a, 41b, 41c and 41d. The assembly code engine 32 then compiles the sub-object data groups 41a, 41b, 41c and 41d into object 39 and outputs the following as output data 45: object 39, and the communication that it has been successfully read. Output data 45 is sent through the local bus 30 to the requesting computer system device (not shown).

As noted above, the present invention may comprise more than one assembly code engine 32 and request controller 34, or more than one system device (not shown) initiating memory complex 9 requests. Accordingly, each arbitrator 38 may receive simultaneous requests from different assembly code engines 32 or different system devices (not shown). In that case each arbitrator 38 arbitrates independently which assembly code engine 32 will acquire it, performs the requested operation, and releases itself to the next requesting assembly code engine 32.

It is important that the arbitrator 38 may assign a sub-object 41 to any available memory address 40 upon its associated memory module 42. In contrast to the prior art, the arbitrator 38 is not restricted to using consecutive memory addresses 40, or the same corresponding address 40 of multiple memory modules 42. The object data 28 comprises the shape parameters and the base memory address $40_N$. The invention stores sub-object 41a in the base address $40_N$, and uses the shape parameters to determine how the remainder of the sub-objects 41b through 41d are stored in the memory complex. FIG. 2 depicts addresses $40_{N+1}, 40_{N+A}$ and $40_{N+A+1}$ as the utilized addresses; however, any one available address 40 on memory module 42a might have been used for sub-object 41b, and any two addresses 40 on any other memory module 42 may have been used for sub-objects 41c and 41d.

As illustrated above, when the assembly code engine 32 requests that an object be written or read as a plurality of sub-objects, the request controller 34 simultaneously accesses the corresponding number of arbitrators 38 through the mux switch 36. In this way the sub-objects are read or written simultaneously, and therefore an object too large to be read or written to one memory address appears transparently to the requesting computer system device as if it is only one address in size, allowing significant improvement in application performance when large objects are processed.

The memory complex of the present invention may comprise memory chips of various address sizes and performance parameters. As illustrated in FIG. 2, the memory addresses 40 have a specific bit size capability. Accordingly, the height, width and offset restrictions for an object 39 written to the memory complex 9 as sub-object data groups 41 are determined by the type of memory module 42 used in the memory complex 9. An important feature of the present invention is that the assembly code engine 32 may be reprogrammed to create sub-object data groups 41 to correspond to the new memory modules 42. In this way a computer system device requesting object 39 data operations will still see the object 39 transparently, and work with object 39 as if read or written to one memory address 40.

An important feature of the invention is that shape parameters can be defined for specific objects. For example, referring again to FIG. 1, object 17 has a shape of (3,1) and must be written or read from addresses 21d, 21e and 21f in three consecutive operations. In contrast, object 18 has the same object data size as object 17, but has a shape of (1,3): it is accessed in one simultaneous request to memory modules 16a, 16b and 16c at addresses 21a, 21b and 21c respectively. Therefore object data important to the performance of the computer system can be assigned a shape with a minimum height parameter, allowing for a significant improvement in system performance. Objects can be written across memory modules on one memory chip board, as illustrated by object 18. They can also be written across more than one board, as object 19 illustrates.

Figure 3:
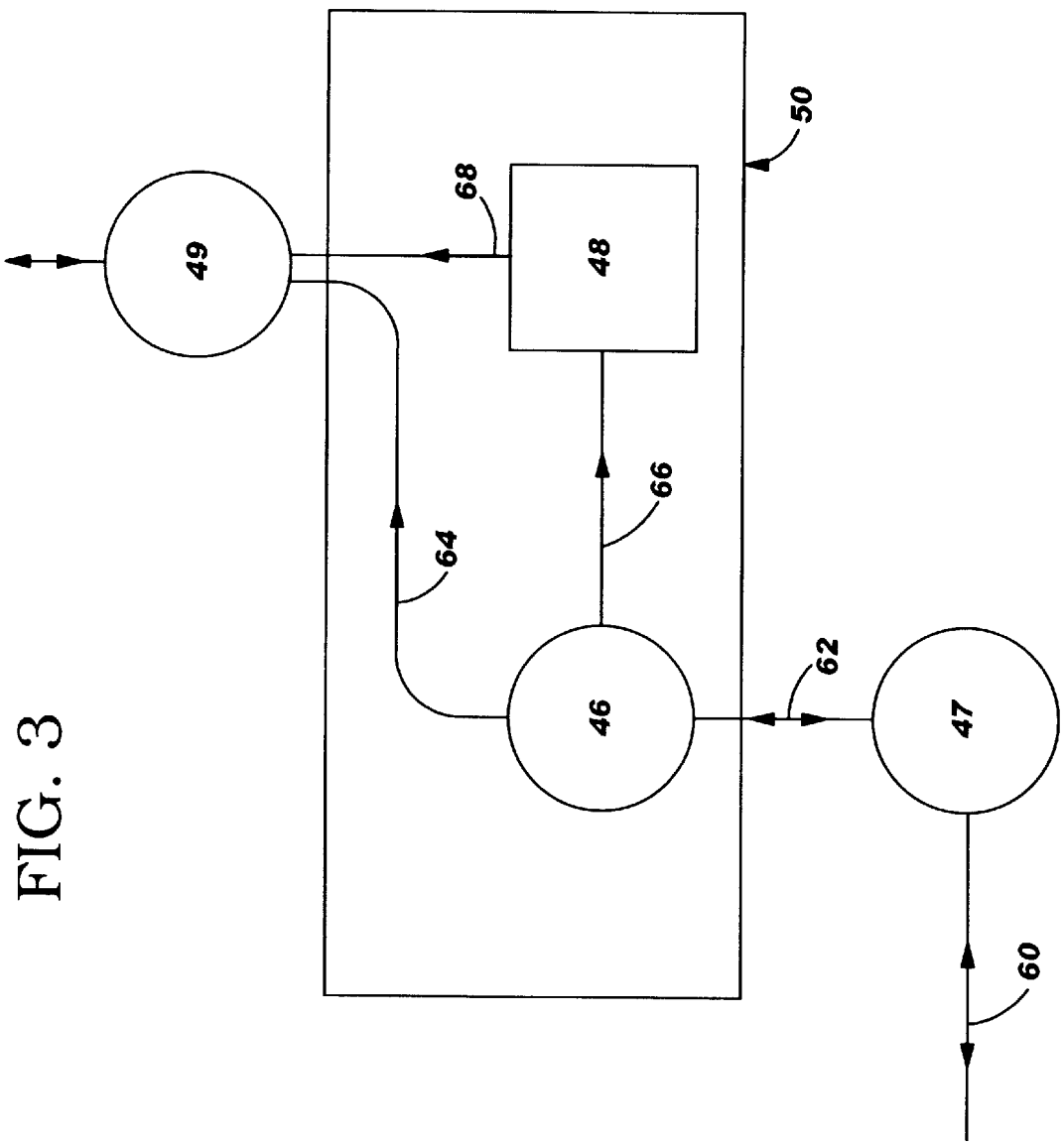
FIG. 3 is a detailed view, somewhat diagrammatic, of the part of structure of the computer system and memory complex of the present invention.

Referring now to FIG. 3, another embodiment of the present invention is illustrated which further comprises a tree search memory system (TSM) 50. Tree search memory systems are well known in the art. As FIG. 3 illustrates, a computer system device (not shown) sends object data 60 to an assembly code engine 47. The assembly code engine 47 processes the object data 60 into assembly code engine output 62. As in the embodiment above, assembly code engine output 60 comprises read or write instructions, object data, and object shape parameters. Object data 60 is outputted by the assembly code engine 47 to the TSM 50.

The TSM 50 comprises a tree search coprocessor 46 and a look-up definition table 48. As illustrated in FIG. 3 the assembly code engine output 62 is received by the tree search coprocessor 46. The tree search coprocessor 46 receives the assembly code engine output 62 and outputs address output 64 to a request controller 49 and output 66 to a look-up definition table 48. The look-up definition table 48 receives the output 66 and outputs shape output 68 to the request controller 49.

In general, the TSM 50 shown in FIG. 3 operates in the following manner: The TSM 50 utilizes a "tree" hierarchy to identify and locate objects to perform high-speed memory lookups, The trees consist of three different kinds of objects: a direct table, pattern search control blocks (PSCBs), and leafs. Each of these objects can have a different size. This is especially true for leafs, which may comprise L3 forwarding leafs, L2 forwarding leafs, L2 filtering leafs, and many types of L4 leafs. Other objects such as aging tables and temporary storage tables, have other shapes. Shaping is used to specify how an object (like a leaf or PSCB) is stored in the TSM.

It is an advantage of the present invention that object shape parameters can be programmed into the look-up definition table 48 to optimize object and sub-object placement within the memory complex. If the memory complex is changed, and memory modules of a different type are utilized, then the look-up definition table 48 can be reprogrammed to optimize object shaping pursuant to the new memory module configuration.

What is claimed is:

1. A computer system and memory complex, comprising:
   a computer system;
   an assembly language engine connected to said computer system;
   a request controller connected to said computer system and said assembly language engine; and
   a plurality of memory modules connected to said request controller, each memory module further comprising a plurality of memory addresses;
   wherein said assembly language engine receives a request from said computer system to process a data object with said memory modules, and said assembly language engine defines said data object as a shape and as at least one sub-object, said shape defining which of said memory module addresses contains said at least one sub-object.

2. The computer system and memory system of claim 1 wherein the assembly language engine is connected to the request controller by means of a tree search memory system, wherein the tree search memory system defines a shape for each of said data objects.

3. The computer system and memory system of claim 1 wherein said data objects are processed in one computer system request cycle.

4. The computer system and memory system of claim 1 wherein the tree search memory system comprises a tree search memory coprocessor and a look-up definition table.

5. The computer system and memory system of claim 1 further comprising a plurality of arbitrators connected to said request controller, each memory module connected to one of said arbitrators, and wherein the assembly language engine may access more than one arbitrator simultaneously.

6. The computer system and memory system of claim 5 wherein the request controller is connected to said arbitrators by a mux data switch.

7. A method for processing object data with a computer system memory complex, comprising the steps of:
   inputting an object data request from a computer system device;
   defining the object data as data sub-objects and shape parameters;
   processing the object data with the memory system as data sub-objects according to the shape parameters; and
   outputting the object data request as object data to the computer system device.

8. The method of claim 7 further comprising the step of defining the object shape parameters in order to optimize the processing of the data sub-objects with the memory system.

9. The method of claim 7 wherein the memory system comprises memory modules of known memory address sizes, and wherein said data sub-objects are defined in a size no greater than the known memory address sizes.

* * * * *